July 13, 1965

P. A. HAWLEY 3,193,925

HEDGE TRIMMER

Filed Dec. 4, 1962

INVENTOR.
PAUL A. HAWLEY
BY
*Robert W. Latham*
ATTORNEY.

United States Patent Office 3,193,925
Patented July 13, 1965

3,193,925
HEDGE TRIMMER
Paul A. Hawley, Jefferson City, Mo., assignor to McGraw-Edison Company, Milwaukee, Wis., a corporation of Delaware
Filed Dec. 4, 1962, Ser. No. 242,273
3 Claims. (Cl. 30—210)

This invention relates to hedge trimmers and more particularly to an improved cutter assembly for a hedge trimmer.

In designing a hedge trimmer cutter bar assembly, one recognized advantage is to incorporate progressive shearing whereby each cooperating pair of shearing edges initiates its cutting action at a different point in the cycle, whereby the load is distributed through the cycle more evenly to reduce the maximum power required and the loading and shock sustained by the structure of the assembly.

Another requirement in a cutter bar is to provide an adequate free opening between the cooperating shearing edges to allow ready admission of the material to be cut therebetween. In addition to an adequate width of opening, this action is facilitated by having the opening occur when the relative motion between the edges is at a minimum. Likewise, to make most effective use of the inertia forces, it is most effective to have the shearing action take place during the portion of the cycle when the speed or velocity of relative motion between the shearing edges is at a maximum.

In the hedge trimmer of the present invention a full depth opening is provided between the teeth of the cutter blade and the stationary bar at each end of the cutting stroke simultaneously with the minimum velocity of the relatively moving parts and the cooperative shearing edges of the cutter blade and stationary bar progressively initiate shearing action therebetween during the intermediate one-half of the stroke at which time the velocity attains the maximum value.

It is an object of this invention to provide an improved hedge trimmer cutter assembly, combining simultaneous full depth opening between cooperating teeth and progressive shearing action between cooperating shearing edges.

It is a further object to provide a cutter bar assembly wherein all the teeth are open at each end of the cutting stroke.

It is also an object of this invention to provide a hedge trimmer cutter bar assembly wherein the opening between cooperating edges occurs during the portion of the cycle wherein there is minimum relative velocity between cooperating edges and shearing occurs during the portion of the stroke wherein there is maximum relative velocity between cooperating shearing edges.

These and other objects and advantages of this invention will become apparent from the following description when taken in connection with the accompanying drawings, wherein.

Figure 1:
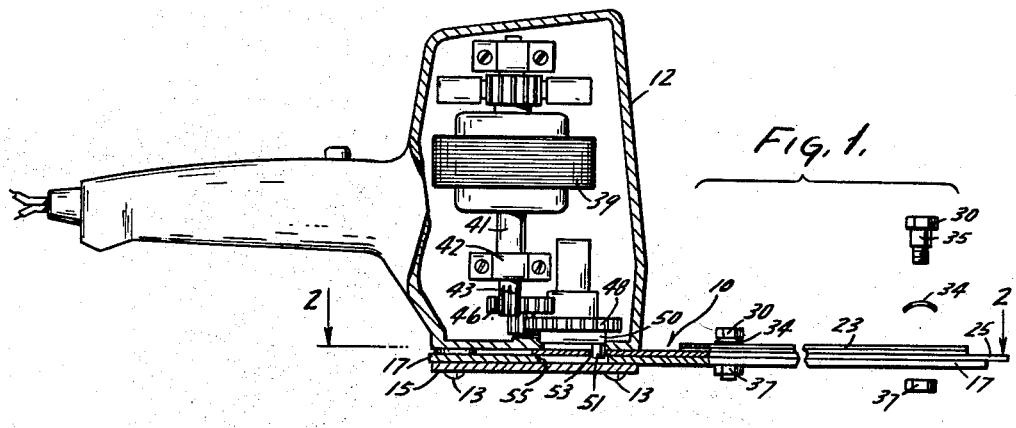
FIG. 1 is a side elevation of the hedge trimmer of this invention with portions thereof broken away.

Referring to FIG. 1, the cutter assembly 10 is secured to the housing 12 by a series of four bolts 13 (only two of which are visible) which pass through the cover plate 15 and the stationary base blade 17 and are secured in threaded openings formed in the housing.

The cutter assembly includes the stationary base blade 17 presenting a series of evenly spaced forwardly projecting teeth 18 (FIG. 2) having blunt tips 19 with side portions 20 rearwardly diverging therefrom to an intermediate location and thereafter presenting converging portions 21 extending toward the root section 22 interconnecting adjoining teeth. The converging surfaces 21 and the root portions 22 form a re-entrant curved surface between adjoining teeth. Overlying the back blade 17 is a hold down bar 23 and a cutter blade 25, the latter presenting evenly spaced truncated triangular teeth 26 having cutting edges 27 arranged in shearing cooperation with the converging tooth portions 21 of the base blade. The assembly is retained as a unit by four bolts 30 which pass through circular openings in the base blade 17 and hold down bar and through the slotted openings 32 in the cutter blade 25, which slotted openings provide for reciprocating movement of the cutter blade 25 with respect to the base bar 17. A spring washer 34 is assembled about each bolt intermediate the head of the bolt and the hold down bar. The length of the cylindrical shank 35 of the bolt is selected to cooperate with the spring washer 34 to provide the desired compressive retaining force between the hold down bar 23, cutter blade 17 and base blade 25 when the nut 37 is assembled tightly against the lower end of the shank 35.

An electric motor 39 is mounted within housing 12. The rotor 41 is secured to the housing by bearing clamps 42 and has a pinion gear 43 formed at the lower end of the rotor shaft which transmits rotational power through the cluster gear 46 to the drive gear 48. Secured to the drive gear 48 for rotation in unison therewith is a drive bushing assembly 50 which has a downwardly depending crank arm 51 extending therefrom. The crank arm 51 acts as a cam as it engages the transverse slot 53 which presents parallel cam follower surfaces 54 in the cutter blade whereby rotation of the bushing assembly 50 causes the crank arm 51 to reciprocate the cutter blade 25 through a stroke, having a length equivalent to the diameter of the circle generated by the rotation of the axis of the crank arm 51. The circular opening 55 in the base blade 17 provides clearance for that portion of the rotating crank arm 51 which extends below the cutter blade 25.

Figure 2:
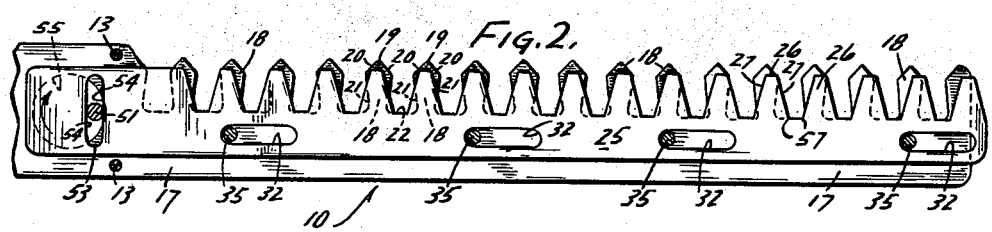
FIG. 2 is a plan view, partially in section, of the cutter bar assembly taken along line 2—2 of FIG. 1, showing the cutter blade in the furthest position to the right.
Figure 4:
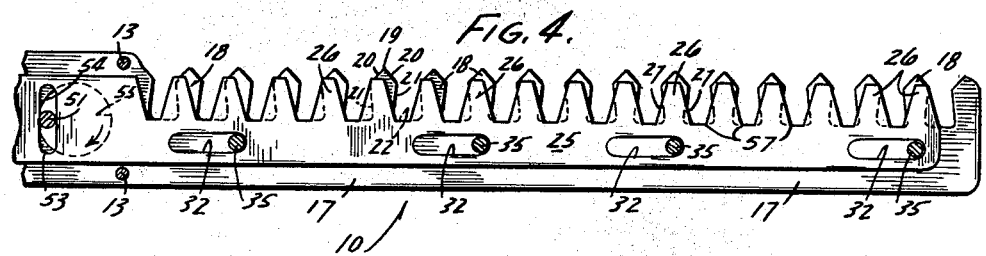
FIG. 4 is a view similar to FIG. 2 with the cutter bar in the furthest position to the left.

As can be seen from FIGS. 2 and 4, there is a full opening between every adjoining cutter blade tooth 26 at each end of the stroke equivalent over the full depth between each pair of adjoining teeth having a minimum width equivalent to the width of the root distance 57 between adjacent cutter blade teeth 26.

Since the distance between centers of adjoining cutter blade teeth 26 is slightly larger than the distance between the centers of the adjacent stationary blade teeth 18, during shearing cooperation between the cutter bar 25 and the base blade 17 each cooperating pair of shearing edges are at a different position in the cycle or to define the action somewhat differently, each cooperating pair of shearing edges initiates the shearing action at a different point in the stroke from every other such pair.

Figure 3:
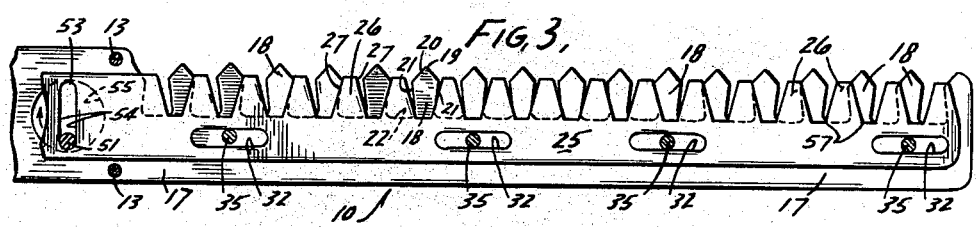
FIG. 3 is a view similar to FIG. 2 with the cutter bar at the mid point of the stroke.

FIG. 3 illustrates the relative orientation of the cutter blade and base blade at the mid-point of the stroke. It will be observed that the cooperating edges furthest left in the figure have just completed the shearing action, whereas the cooperating pair of edges farthest right are just about to enter shearing cooperation.

As the crank arm rotates at a constant angular velocity the initial and final quarters of the stroke are accomplished through a rotation of 60 degrees of crank arm rotation for each such one-quarter portion. The intermediate half stroke occurs during 60 degrees rotation of the crank arm or half of the angular distance. Accordingly, the average velocity of the intermediate portion is twice that of the average velocity during the initial and final quarters of the stroke. Since all shearing action between cooperating edges occurs during the intermediate half portion of the stroke of highest velocity and accordingly substantially all cutting action, maximum use is made of the period of highest inertia force compatible with progressive shearing. Likewise, the above-mentioned full depth opening between adjoining teeth occurs during the terminal portions of the stroke utilizing the minimum velocity occurring at the end of each stroke and the lower average velocity of the initial and terminal quarter portion of the stroke to afford maximum access of material to be cut through the openings between the blade teeth.

Although but one embodiment has been shown and described it will be apparent that various changes and modifications may be made therein without departing from the spirit of the invention or from the scope of the appended claims.

I claim:

1. A hedge trimmer comprising: a stationary base blade presenting a series of spaced teeth; a reciprocable cutter blade presenting a series of spaced teeth in overlying shearing cooperation respectively with said base blade teeth, said cutter blade having a spacing between adjoining teeth dissimilar to the spacing of adjoining teeth of said base blade whereby some pairs of cooperating teeth initiate shearing cooperation prior to initiation of such shearing cooperation by other pairs of cooperating teeth; and drive means connected to said cutter blade to reciprocate said cutter blade with respect to said base blade and determine the stroke of said cutter blade with respect to said stationary blade, said cutter blade being positioned with respect to said stationary blade so as to present a full depth opening between adjoining teeth of each blade at each end of the stroke of said cutter blade and all movable blade teeth are displaced from a position of shearing cooperation with said stationary blade at each end of each stroke.

2. A hedge trimmer comprising a stationary base blade having spaced teeth therealong; a reciprocable cutter blade mounted in overlying relation to said base blade having spaced teeth therealong disposed in cooperative cutting relation with said base blade teeth, said base blade spacing and said reciprocable cutter blade tooth spacing being dissimlar; and motor means drivingly connected to said cutter blade for reciprocating said cutter blade through a stroke of predetermined length with said base blade and said cutter blade so disposed with respect to one another that a full depth opening is presented between adjoining teeth of each blade at the end of each stroke and the cutter blade tooth cutting edges are positioned with respect to the respective stationary blade cooperating edges such that shearing action between cooperating edges commences sequentially with each pair of cooperating edges disposed at a different position in the shearing cycle with respect to every other such pair during the shearing portion of the cutter blade stroke and substantially all shearing cooperation between said movable blade and said stationary blade commences after the first quarter portion of each stroke and prior to the final quarter portion of each stroke.

3. A hedge trimmer comprising a stationary base blade having equally spaced teeth therealong; a movable cutter blade having equally spaced teeth therealong and mounted on said base blade in cooperating, reciprocating cutting relation thereto, said cutter blade tooth spacing being greater than said base blade tooth spacing such that the movable blade tooth cutting edges are positioned with respect to the cooperating stationary blade tooth edges so as to initiate shearing action between certain cooperating edges prior to initiation of such shearing action between other cooperating shearing edges; and motor means drivingly connected to said cutter blade for reciprocating said cutter blade relative to said base blade, determining the stroke of said movable blade and positioning said blades with respect to one another so as to present a full depth opening between adjoining teeth of each blade at the end of each stroke of said cutter blade and to cause substantially all shearing cooperation between said stationary blade and said movable blade to occur during the mid-half portion of each stroke.

References Cited by the Examiner

UNITED STATES PATENTS

| | | | |
|---|---|---|---|
| 360,374 | 3/87 | Clough | 30—223 X |
| 660,281 | 10/00 | Traphagen | 30—223 X |
| 997,218 | 7/11 | Thompson et al. | 30—223 X |
| 1,165,737 | 12/15 | Widoe | 30—223 X |
| 2,763,925 | 9/56 | Asbury | 30—225 X |
| 2,964,845 | 12/60 | Dooling | 30—216 |
| 3,083,457 | 4/63 | Ottosen et al. | 30—216 |

WILLIAM FELDMAN, *Primary Examiner.*

MILTON MEHR, *Examiner.*